June 28, 1955   W. K. ARCHER ET AL   2,711,766
CONTAINER
Filed Oct. 15, 1949
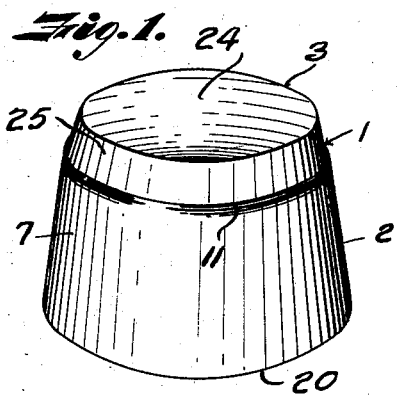
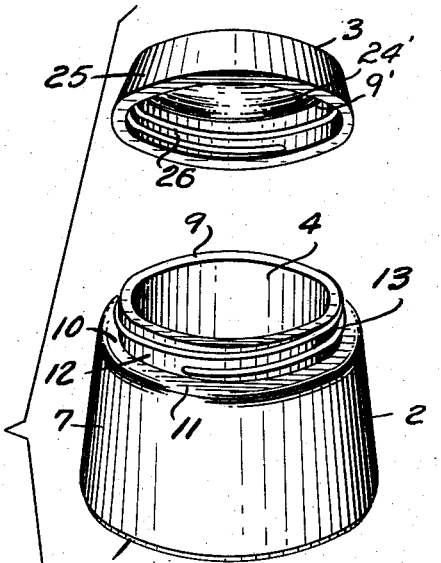
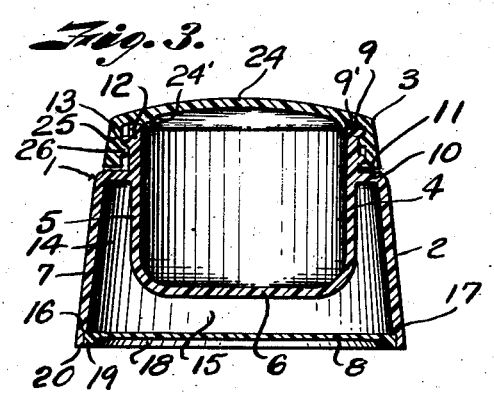
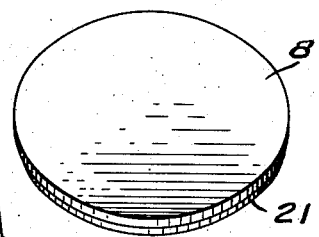
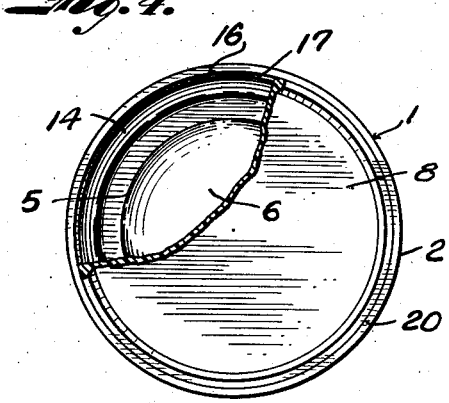
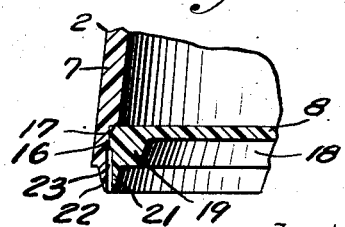
Inventors
William K. Archer and
Paul A. Marchant
By Fishburn & Mullendore
Attorneys

# United States Patent Office 2,711,766
Patented June 28, 1955

2,711,766

CONTAINER

William K. Archer, Johnson County, Kans., and Paul A. Marchant, Jackson County, Mo., assignors to Injection Molding Company, Kansas City, Mo., a corporation of Missouri Application October 15, 1949, Serial No. 121,602

1 Claim. (Cl. 150—.5)

This invention relates to containers adapted for packaging creams, salves and similar paste-like products, the principal object being to provide a container of this character adapted for manufacture from plastic material by molding in high pressure production dies.

One difficulty with containers formed of plastic is that considerable less wall thickness is required than with the usual glass jar in which such preparations are usually packaged, consequently, the purchaser is led to believe that he is not getting the same quantity even though the inner cavity is exactly the same capacity. It is, therefore, a further object of the invention to provide a container having an exterior size comparable with that of the usual jar, while retaining the same inner capacity without using an excessive quantity of plastic material.

Other objects of the invention are to provide a jar type container having an insulated wall and bottom structure to retard the effectiveness of exterior heat and cold on the contents, to provide a container adapted to various exterior shapes while maintaining a cavity which facilitates easy removal of the contents, to provide a container that is of light weight, to provide a container that is substantially resilient and not breakable, and to provide a container which does not require an inner liner in the cap to effect a seal.

In accomplishing these and other objects of the invention hereinafter pointed out, we have provided improved structure, the preferred form of which is illustrated in the accompanying drawing wherein:

Fig. 1 is a perspective view of a jar-like container constructed in accordance with the present invention.

Fig. 2 is a perspective view of the parts of the container shown in disassembled spaced relation.

Fig. 3 is a vertical section through the container.

Fig. 4 is a bottom plan view of the container showing the outer bottom broken away to illustrate the insulating space.

Fig. 5 is a fragmentary section through the base of the container prior to sealing of the outer bottom thereof.

Referring more in detail to the drawing:

1 designates a jar-like container constructed in accordance with the present invention and which includes an open top hollow body 2 and a closure cap 3, both being formed of plastic material by molding in high pressure production dies.

The body portion 2 includes an inner cavity 4 for containing a product such as a cream, salve or other paste-like material, the cavity 4 being of a shape to facilitate removal of the material and of a size corresponding in capacity to the quantity of material to be placed therein. The cavity 4 is formed by an inner annular wall 5 curving into an integral bottom 6, the top being open the full diameter of the cavity to facilitate removal of the core element of the forming die and to facilitate insertion and removal of the material when the container is used.

Since the container is formed of plastic, the wall 5 and bottom 6 may be relatively thin, as compared with the wall thickness of a customary glass jar, with the result that the exterior diameter is substantially less than the corresponding diameter of the comparable jar. It is, therefore, desirable to shroud the wall 5 and bottom 6 with an outwardly spaced wall 7 and a bottom 8, the wall 7 being connected with the wall 5 at a point below the upper edge 9 thereof by an annular flange portion 10 which forms a shoulder 11 and leaves a sufficient portion of the wall 4 projecting thereabove to provide a neck 12, having exterior threads 13 for attaching the cover 3. As will be noted from Fig. 3, this neck 12 is of substantially greater thickness than the wall 5 and the wall 7. The flange portion 10 and wall 7 may be formed integrally with the wall portion 5, however, to permit formation of an inner annular space 14 between the wall portions 5 and 7, the bottom 8 is formed of a part which is separately molded and attached to the base portion of the wall 7 in spaced relation with the bottom 6, as now to be described. While the exterior of the wall 7 may be of any desired shape, for example, conical, as illustrated, it is preferably of sufficient height so that the base portion thereof extends a distance below the bottom 6 to provide a space 15 therebetween in connection with the space 14. The inner circumferential face of the wall 7 is provided with an internal annular groove 16 to receive the bottom 8 and provide a shoulder 17 against which the bottom rests, as shown in Fig. 3.

The bottom 8 comprises a substantially flat disk of suitable size to be engaged within the groove 16. The bottom member is recessed as at 18 on the underside thereof to leave an annular rim 19 which cooperates with the edge of the wall 7 to provide a substantially flat base rim 20, which forms a stable bottom for the container. The bottom may be secured in position in any suitable manner, however, if the annular space 14 and bottom space are to be used for their insulating qualities, the bottom must be hermetically sealed, and to accomplish this purpose, the bottom 8 is provided around the exterior thereof with a depending lip 21 that cooperates with a lip 22 on the lower edge of the wall 7, the lips normally being spaced apart by a groove 23 which preferably extends within the wall portion 7 to receive fused material when the lips 21 and 22 are fused together, as by placing the bottom of the container on a heated surface and applying pressure to force the fused material of the lips into the groove, thereby effecting a seal.

The cap or lid 3 may be of conventional shape in that it includes a crown top 24 having a flange 25 provided with internal threads 26 adapted to engage the threads 13 of the neck of the container, the flange being of a depth relative to the depth of the neck to effect sealing contact between an annular seat 9' that is formed on the underface of the cap and the upper edge 9 of the container prior to any contact of the flange with the shoulder 10. If desired, a depending annular lip 24' may be provided within the seat 9' to engage within the inner circumferential face of the neck 12 to additionally enhance the seal.

From the foregoing, it is obvious that we have provided a container for creams, salves and the like which may be readily formed of plastic and which has the appearance of the usual container formed of glass or other heavy material. It is also obvious that the space surrounding the inner wall provides for insulation to prevent rapid heat exchange between the exterior of the container and the contents contained in the cavity thereof. It is also obvious that cavity 4 as well as the exterior of the container may be of any suitable shape as desired for meeting the requirements of the trade.

What we claim and desire to secure by Letters Patent is:

A molded, plastic, resilient container including an uninterrupted inner annular wall and bottom forming an open top cavity to receive hot material, said annular wall having an integral thickened neck portion extending upwardly therefrom and substantially consistituting a continuation of said annular wall, a substantially horizontally disposed uniform, thin and narrow flange portion encircling, outwardly extending from and integral with the inner annular wall at the lower part of the neck portion, an uninterrupted outer wall portion integral with, of substantially the same thickness as and merging into said flange portion so as to provide a smooth outer surface free of projections and the like, said outer wall portion being concentrically spaced from the first mentioned wall and having a lower end portion terminating in spaced relation to the bottom of the cavity, whereby maximum flexure of said flange, neck portion and the inner and outer walls is permitted without rupture of the same, and whereby heat from the material packed in the cavity can be readily dissipated before reaching the joint for the bottom member, a substantially flat bottom member of lesser outside diameter than said lower end portion of said outer wall portion, secured to said lower end portion and substantially spaced from said bottom to close the space between said walls, and a removable closure for the neck portion.

References Cited in the file of this patent

UNITED STATES PATENTS

| Number | Name | Date |
|---|---|---|
| 966,216 | Kather et al. | Aug. 2, 1910 |
| 1,523,152 | Wolfe | Jan. 13, 1925 |
| 2,076,549 | Conner | Apr. 13, 1937 |
| 2,076,550 | Conner | Apr. 13, 1937 |
| 2,077,215 | Conner | Apr. 13, 1937 |
| 2,077,216 | Conner | Apr. 13, 1937 |
| 2,077,218 | Conner | Apr. 13, 1937 |
| 2,219,576 | Moreland | Oct. 29, 1940 |
| 2,546,206 | Barton | Mar. 27, 1951 |